United States Patent
Eguchi et al.

(10) Patent No.: US 10,195,835 B2
(45) Date of Patent: Feb. 5, 2019

(54) PRE-PROCESSING METHOD FOR ADHERING RUBBER LAYER TO INNER AND OUTER SURFACES OF CYLINDRICAL OBJECT-OF-ADHERENCE

(71) Applicant: NAKASHIMA RUBBER INDUSTRY CO., LTD., Fukuoka (JP)

(72) Inventors: Rikito Eguchi, Fujisawa (JP); Mikio Nakashima, Kurume (JP); Yoshikuni Takata, Kurume (JP); Takemi Yoshizumi, Kurume (JP)

(73) Assignee: NAKASHIMA RUBBER INDUSTRY CO., LTD., Fukuoka (JP)

( * ) Notice: Subject to any disclaimer, the term of this patent is extended or adjusted under 35 U.S.C. 154(b) by 22 days.

(21) Appl. No.: 15/115,184

(22) PCT Filed: Jan. 29, 2014

(86) PCT No.: PCT/JP2014/000439
§ 371 (c)(1),
(2) Date: Jul. 28, 2016

(87) PCT Pub. No.: WO2015/114678
PCT Pub. Date: Aug. 6, 2015

(65) Prior Publication Data
US 2016/0355702 A1 Dec. 8, 2016

(51) Int. Cl.
*B32B 37/10* (2006.01)
*B29C 70/44* (2006.01)
(Continued)

(52) U.S. Cl.
CPC .............. *B32B 37/10* (2013.01); *B29C 70/44* (2013.01); *B29C 70/443* (2013.01); *C09J 5/02* (2013.01);
(Continued)

(58) Field of Classification Search
CPC ...... C09J 2205/306; B32B 37/10; B30B 5/02; B29C 70/44; B29C 70/443
See application file for complete search history.

(56) References Cited

U.S. PATENT DOCUMENTS

2009/0020905 A1* 1/2009 Privett .................. H01C 17/06
264/171.1

FOREIGN PATENT DOCUMENTS

| CA | 439887 A | 2/1947 |
|----|----------|--------|
| JP | S52-032070 A | 3/1977 |

(Continued)

OTHER PUBLICATIONS

The extended European search report issued by the European Patent Office dated Feb. 8, 2017, which corresponds to European Patent Application No. 14880445.3-1308 and is related to U.S. Appl. No. 15/115,184.

(Continued)

*Primary Examiner* — Christopher T Schatz
(74) *Attorney, Agent, or Firm* — Studebaker & Brackett PC

(57) ABSTRACT

The method includes forming, on a bonding object surface of a bonding object, an adhesive layer for bonding an unvulcanized rubber onto the bonding object surface, through use of an adhesion sheet and a fixing device. The fixing device includes an enclosed chamber. The fixing device is configured such that a gas in the chamber can be discharged and a gas can be introduced into the chamber. The fixing device includes a table which is arranged in the chamber and on which the bonding object can be placed. The adhesion sheet includes a top coating adhesive layer formed on a film and an undercoating adhesive layer formed on the top coating adhesive layer.

8 Claims, 8 Drawing Sheets

(51) Int. Cl.
*C09J 5/02* (2006.01)
*C09J 5/06* (2006.01)
*B30B 5/02* (2006.01)
*F16L 58/10* (2006.01)

(52) U.S. Cl.
CPC . *C09J 5/06* (2013.01); *B30B 5/02* (2013.01); *C09J 2205/306* (2013.01); *C09J 2400/163* (2013.01); *C09J 2400/166* (2013.01); *C09J 2421/006* (2013.01); *F16L 58/10* (2013.01)

(56) References Cited

FOREIGN PATENT DOCUMENTS

| | | |
|---|---|---|
| JP | S59-163104 A | 9/1984 |
| JP | S60-018563 A | 1/1985 |
| JP | S60-228134 A | 11/1985 |
| JP | S63-039976 A | 2/1988 |
| JP | S63-063774 A | 3/1988 |
| JP | 02-085129 U | 7/1990 |
| JP | H03-047732 A | 2/1991 |
| JP | 2010-013567 A | 1/2010 |
| JP | 4681634 B2 | 5/2011 |

OTHER PUBLICATIONS

International Search Report issued in PCT/JP2014/000439; dated Apr. 15, 2014.
Written Opinion issued in PCT/JP2014/000439; dated Apr. 15, 2014.
International Preliminary Report on Patentability and Written Opinion, with English language translation, dated Aug. 2, 2016 in corresponding PCT Application No. PCT/JP2014/000439, 18pp.

\* cited by examiner

PRE-PROCESSING METHOD FOR ADHERING RUBBER LAYER TO INNER AND OUTER SURFACES OF CYLINDRICAL OBJECT-OF-ADHERENCE

TECHNICAL FIELD

The present invention relates to a method of forming in advance, on a bonding object surface of a bonding object, an adhesive layer for bonding a rubber layer of an unvulcanized rubber onto the bonding object surface. More particularly, the present invention relates to a method in which the bonding object has a tubular shape.

BACKGROUND ART

As a material for forming in advance an adhesive layer on a bonding object surface of a bonding object in order to fix a rubber layer onto the bonding surface, in Patent Literature 1, there is a disclosure of an adhesion sheet. In bonding of the rubber layer onto a metal, the adhesion sheet functions as an adhesive between a surface of the metal serving as the bonding object and an unvulcanized rubber layer to be bonded onto the surface of the metal. First, the adhesion sheet is described.

In FIG. 9, a film 20 of the adhesion sheet disclosed in Patent Literature 1 is illustrated. An adhesion sheet 20 disclosed in Patent Literature 1 includes a film 21, a top coating adhesive layer 22, and an undercoating adhesive layer 23. The film 21 of the adhesion sheet 20 is paper or the like, or a sheet material made of, for example, a polymer compound, specifically nylon, polypropylene (PP), polyethylene (PE), polyester, or polyimide. As a material for the film, a material having high heat resistance is preferred, and hence a film whose material is a polymer compound having high heat resistance, such as polyester or polyimide, is preferred. Of the polyesters, polyethylene terephthalate (PET) or the like is said to be most suitable as the material for the film.

A "solvent-dispersed vulcanized adhesive" having reactivity to the rubber layer to be bonded is applied onto a surface of the film 21 on one side. For example, under a state in which the film can be continuously fed, the solvent-dispersed vulcanized adhesive is applied onto the surface of the film on one side and formed. The solvent-dispersed vulcanized adhesive is formed into the top coating adhesive layer 22 to be finally formed. After the application, the adhesive is dried by evaporating a solvent that is a volatile component. Thus, the top coating adhesive layer 22 of the solvent-dispersed vulcanized adhesive is formed on the surface of the film 21 one side. The top coating adhesive layer 22 serves as a rubber layer-side adhesive when the rubber layer is bonded onto a metal.

After the formation of the top coating adhesive layer 22 on the surface of the film 21, the undercoating adhesive layer 23 is further formed on a surface of the top coating adhesive layer 22 on an upper side (surface on the opposite side to the film 21 out of the surfaces of the top coating adhesive layer 22). The undercoating adhesive layer 23 is formed by applying an adhesive having reactivity to the metal serving as the bonding object. The undercoating adhesive layer 23 is formed in the same manner as in the case of the formation of the top coating adhesive layer 22. For example, the film 21 having formed thereon the top coating adhesive layer 22 is continuously fed from a roller at a constant speed, and the adhesive is applied onto the surface of the top coating adhesive layer 22 of the film 21 at a predetermined thickness. After the application, the adhesive is dried so as to evaporate a solvent that is a volatile component. As a result, the adhesive sheet 20 in which the top coating adhesive layer 21 of the solvent-dispersed vulcanized adhesive is formed on the surface of the film 21 on one side and the undercoating adhesive layer 23 is further formed thereon is obtained. When the rubber layer is bonded onto a metal, the top coating adhesive layer 22 serves as a metal-side adhesive. The undercoating adhesive layer 23 is interposed between the rubber layer and the bonding object, and the adhesive layers allow the unvulcanized rubber to be fixed onto the bonding object.

CITATION LIST

Patent Literature

PTL 1: Japanese Patent No. 4681634

SUMMARY OF INVENTION

Technical Problem

In view of the foregoing, the bonding of the undercoating adhesive layer 23 onto the adhesive sheet 20 is desirably performed by a method based on conditions appropriate for bonding the undercoating adhesive layer 23 onto a bonding object. Particularly when the bonding object has a hollow cylindrical shape, the bonding of the undercoating adhesive layer 23 onto the inner surface of its cylindrical hollow portion or its outer surface is desirably performed by a method suitable for the shape of the inner surface or the outer surface.

Solution to Problem

In order to solve the problem, according to one embodiment of the present invention, there is provided a method of forming, on an inner surface of a hollow portion of a bonding object having the hollow portion, an adhesive layer for bonding an unvulcanized rubber layer onto the inner surface of the hollow portion, the method including the steps of: bonding, onto the inner surface of the hollow portion of the bonding object, an undercoating adhesive layer of an adhesion sheet including a top coating adhesive layer formed on a film and the undercoating adhesive layer formed on the top coating adhesive layer; heating the bonding object having bonded thereonto the adhesion sheet; and uniformly pressing the adhesion sheet through pressing of the film by inserting an elastic pressing member into the hollow portion and compressing the elastic pressing member in an axis direction to deform the elastic pressing member in a radial direction.

In order to solve the problem, according to another embodiment of the present invention, there is provided a method of forming an adhesive layer for bonding an unvulcanized rubber layer onto an outside curved surface of a bonding object, the method including the steps of: bonding, onto the outside curved surface of the bonding object, an undercoating adhesive layer of an adhesion sheet including a top coating adhesive layer formed on a film and the undercoating adhesive layer formed on the top coating adhesive layer; heating the bonding object having bonded thereonto the adhesion sheet; and uniformly pressing the adhesion sheet through pressing of the film by inserting the bonding object into a hollow portion of an elastic pressing member having the hollow portion and compressing the elastic pressing member in an axis direction to deform the elastic pressing member in a radial direction.

Advantageous Effects of Invention

According to the invention of the present application, the adhesive layer for bonding an unvulcanized rubber onto the inner or outer surface of a tubular member can be effectively formed on the bonding object surface.

DESCRIPTION OF EMBODIMENTS (First Embodiment)

Figure 1A:
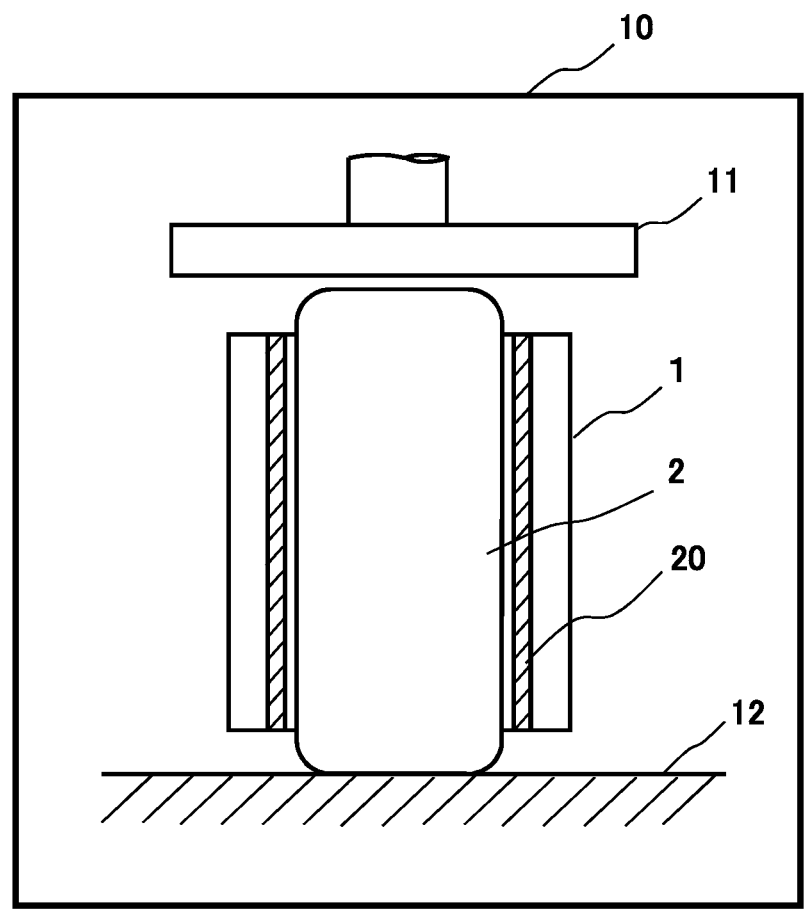
FIG. 1A is an illustration of a method of forming an adhesion layer on the inner surface of a tube according to a first embodiment of the present invention.

A method and apparatus for forming an adhesion layer on the inner surface of a cylindrical member are described with reference to FIG. 1A and FIG. 1B. This method is typically a method involving forming, when bonding a rubber layer onto the inner surface of a metallic bonding object 1 having a hollow tubular shape, an adhesion layer for bonding the rubber layer on the inner surface of the cylindrical member as pretreatment for bonding the rubber layer onto the inner surface of the tubular member. The bonding object 1 onto which the rubber layer is to be bonded has a tubular shape having a hollow portion. The tubular shape typically has a circular cross-section, or may have a polygonal cross-section.

First, an undercoating adhesive layer 23 of an adhesive sheet 20 is bonded onto the inner surface of the bonding object 1 so as to be brought into close contact along the curved surface of the inner surface. When the adhesive sheet 20 is bonded onto the inner surface of the bonding object 1 as just described, a film 21 of the adhesive sheet 20 is positioned on the innermost side.

Subsequently, an elastic pressing member 2 is inserted into the hollow portion of the bonding object 1. The radius of the elastic pressing member 2 is set to be smaller than the inner diameter of a tube to be formed by the film 21 of the adhesive sheet 20 when the adhesive sheet 20 is bonded onto the inner surface of the bonding object 1. The length of the elastic pressing member 2 is set to be longer than the length of the bonding object 1. A typical material for the elastic pressing member 2 is a silicon rubber, and its Poisson's ratio is about 0.5. However, any material having a similar Poisson's ratio may be used as the elastic pressing member 2. For example, a cylindrical bag of a heat-resistant resin film filled with a heat-resistant gel may be used. The diameter of the elastic pressing member 2 is set so as to become, through deformation during compression of both ends thereof, larger than the inner diameter of the bonding object 1 formed by the film 21 of the adhesive sheet 20 after deformation. In addition, the elastic pressing member 2 is preferably produced so as to have a diameter of substantially the same curvature as that of the inner surface of the bonding object 1. When the inner surface of the tube has a polygonal shape, the same polygonal shape is adopted as the shape of the elastic pressing member 2, and a polygonal shape of such a size as to have the same distance from each surface serving as the bonding object surface of the bonding object 1 is selected. Under this state, for the purpose of softening the undercoating adhesive 23, the bonding object 1 having the adhesive sheet 20 bonded onto its inner surface is placed on a table 12 in a heating chamber 10 to bring the bonding object 1 and the adhesive sheet 20 into a high-temperature environment. The bonding object 1 having the adhesive sheet 20 bonded onto its inner surface is typically placed so that the longitudinal direction (central axis direction) of the elastic pressing member 2 may be perpendicular to the upper surface of the table 12. Then, the temperature in the heating chamber 10 is increased to from about 80 degrees Celsius to about 120 degrees Celsius. The timing of increasing the temperature of the heating chamber 10 may be arbitrarily set.

In the heating chamber 10, a pressing plate 11 arranged to be parallel to the upper surface of the table 12 is prepared. The pressing plate 11 is movable along the central axis direction of the elastic pressing member 2 while the pressing surface of the pressing plate 11 keeps a parallel positional relationship with the upper surface of the table 12. After the inside of the heating chamber 10 has been sufficiently degassed, and its temperature has been increased to from about 80 degrees Celsius to about 120 degrees Celsius, which is sufficient for heating of the adhesion sheet 20, under a state in which the temperature is stabilized, the pressing plate 11 is moved along the central axis direction of the elastic pressing member 2. When the pressing plate 11 is moved along the central line direction of the elastic pressing member 2, as illustrated in FIG. 1B, the elastic pressing member 2 is compressed in the central line direction in accordance with the amount of the movement. When the elastic pressing member 2 is compressed along its central line direction, as the length of the elastic pressing member 2 becomes shorter, the diameter of the elastic pressing member 2 increases. When the diameter of the pressing plate 11 becomes larger than the inner diameter of a cylinder formed by the film 21 of the adhesive sheet 20, the film 21 of the adhesive sheet 20 is pushed against the inside of the bonding object 1, and the adhesive sheet 20 can be brought into pressure contact in such a state that the undercoating adhesive layer 23 is brought into close contact with the inner surface of the bonding object 1 along the curved surface of the inner surface.

From the time point when the compression of the elastic pressing member 2 in its central line direction by the pressing plate 11 is started, pressure contact is continued, and after the lapse of a predetermined period of time, the undercoating adhesive layer 23 is stuck onto the inner surface of the bonding object 1. A period of time longer than the predetermined period of time is set as a pressure time. The period of time changes depending on the softening temperature and viscosity of the undercoating adhesive 23, and hence is determined in accordance with the softening temperature and viscosity of the undercoating adhesive 23. After that, when the pressing plate 11 is returned to the original position, the inner diameter of the elastic pressing member 2 is also restored within a short period of time. Then, the elastic pressing member 2 is removed, and thus a state in which the adhesive sheet 20 is bonded onto the inside of the bonding object 1 is achieved. Thus, the pretreatment for bonding the rubber layer onto the inner surface of the cylindrical bonding object is completed. Under this state, after cooling, the film 21 is peeled, and thus the top coating adhesive layer 22 appears inside the bonding object 1. The rubber layer is bonded onto the top coating adhesive layer 22, and thus the rubber layer can be bonded onto the inner surface of the bonding object 1.

Figure 1B:
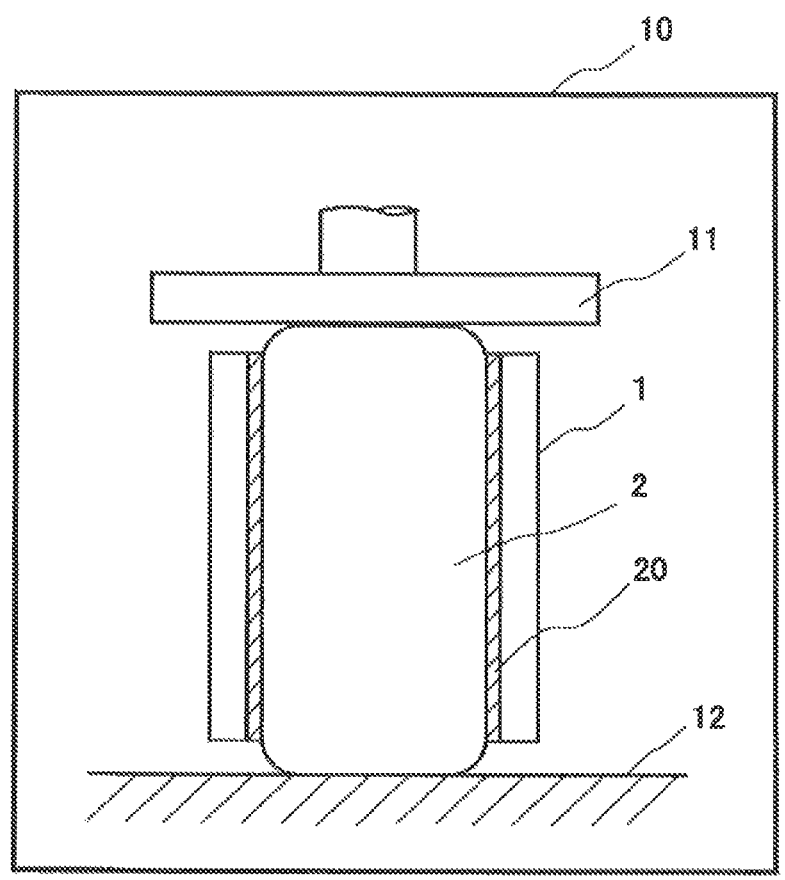
FIG. 1B is an illustration of a method of forming an adhesion layer on the inner surface of a tube according to a first embodiment of the present invention.

In addition, although in FIG. 1A and FIG. 1B, the pressing plate 11 and the elastic pressing member 2 are separated, one end of the elastic pressing member 2 may be allowed to be stuck onto the pressing plate 11. The position of the bonding object 1 is set so that the axis direction of the bonding object 1 and the axis direction of the elastic pressing member 2 coincide with each other. In this case, as the pressing plate 11 moves, the elastic pressing member 2 is inserted toward the inner part of the bonding object 1. After the insertion of the elastic pressing member 2 into the bonding object 1, compressive deformation of the elastic pressing member 2 starts when the other end of the elastic pressing member 2 is brought into contact with the upper surface of the table 12, with the result that pressure contact in which the film 21 of the adhesive sheet 20 is pushed against the inside of the bonding object 1 is started.

(Second Embodiment)

Figure 2:
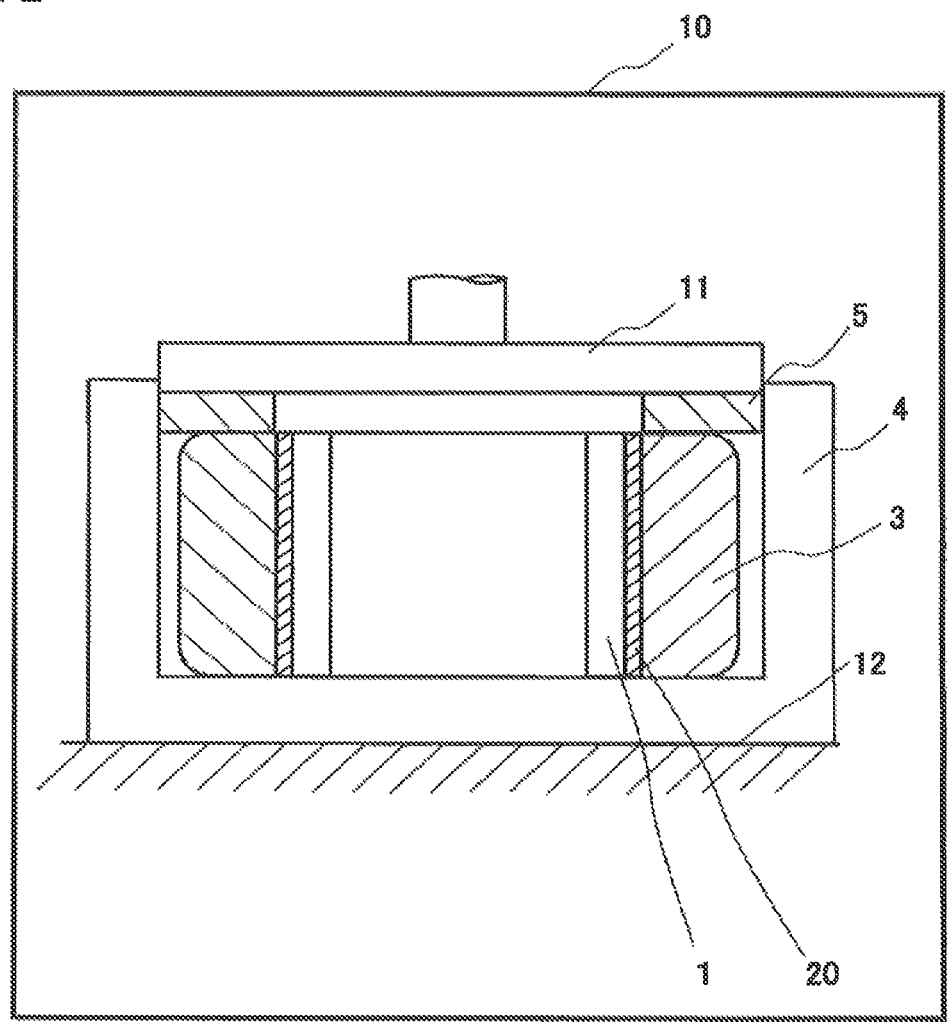
FIG. 2 is an illustration of a method of forming an adhesion layer on the outer surface of a tube according to a second embodiment of the present invention.

Next, a method and apparatus for bonding an adhesion layer onto the outer surface of a member having a tubular shape or a pillar shape are described with reference to FIG. 2. This method is typically a method involving forming, when bonding a rubber layer onto the outer surface of the metallic bonding object 1 having a tubular shape or a pillar shape, an adhesion layer for bonding the rubber layer on the outer surface of the member having a tubular shape or a pillar shape as pretreatment for bonding the rubber layer onto the outer surface of the member. The bonding object 1 onto which the rubber layer is to be bonded typically has a columnar or cylindrical shape, but may have a polygonal shape. Here, a description is made by taking the case of a cylindrical shape as an example.

First, the undercoating adhesive layer 23 of the adhesive sheet 20 is bonded onto the inner surface of the bonding object 1 so as to be brought into close contact along the curved surface of the inner surface. When the adhesive sheet 20 is bonded onto the outer surface of the bonding object 1 as just described, the film 21 of the adhesive sheet 20 is positioned on the outermost side.

Next, an annular elastic pressing member 3 having a hollow portion is prepared. The diameter of the hollow portion of the elastic pressing member 3 is set to be larger than the diameter of a tube to be formed by the film 21 of the adhesive sheet 20 when the adhesive sheet 20 is bonded onto the outer surface of the bonding object 1. The length of the elastic pressing member 2 is set to be longer than the length of the bonding object 1. A material for the elastic pressing member 2 may be selected in the same manner as in the case of the elastic pressing member 2 described in the first embodiment, and a typical example thereof is a silicon rubber. The diameter of the hollow portion of the elastic pressing member 3 is set so as to become, through deformation during compression of both ends of the elastic pressing member 3, smaller than the outer diameter of the bonding object 1 formed by the film 21 of the adhesive sheet 20 after deformation. In addition, as in the first embodiment, the elastic pressing member 3 is preferably produced so as to have a diameter of substantially the same curvature as that of the outer surface of the bonding object 1. Under this state, the bonding object 1 having the adhesive sheet 20 bonded onto its outer surface is inserted into the hollow portion of the elastic pressing member 3. Then, as in the first embodiment, the elastic pressing member 3 having inserted thereinto the bonding object 1 is placed on the table 12 in the heating chamber 10. The elastic pressing member 3 having inserted thereinto the bonding object 1 is typically placed so that the longitudinal direction (central axis direction) of the elastic pressing member 2 may be perpendicular to the upper surface of the table 12. The heating chamber 10, the pressing plate 11, and the table 12 are set in the same manner as in the first embodiment.

Under a state in which the adhesion sheet 20 is heated by the heating chamber 10, when the pressing plate 11 is moved along the central line direction of the elastic pressing member 3, as in the first embodiment, the elastic pressing member 3 is pressed in its central axis direction in accordance with the amount of the movement. Along with this, the inner diameter of the elastic pressing member 3 decreases. In the second embodiment, a ring member 5 is inserted between the pressing plate 11 and the bonding object 1 in order to compress only the elastic pressing member 3 when the pressing plate 11 is moved without interfering with the bonding object 1 during the movement of the pressing plate 11. For example, the ring member 5 has a hole larger than the outer diameter of a cylinder formed by the film 21 of the adhesive sheet 20, and can apply a pressure to only the elastic pressing member 3 under a state in which the bonding object 1 is fitted in the hole even when the pressing plate 11 is moved. Alternatively, a hole larger than the outer diameter of the bonding object may be arranged in the pressing plate 11 itself.

In the second embodiment, the elastic pressing member 3 has a doughnut shape having a hollow portion, and hence when a compressive force is applied in its axis direction by the pressing plate 11, the elastic pressing member 3 deforms toward both the inside and outside in its radial direction. In order to efficiently compress the adhesive sheet 20 against the bonding object 1, a regulating frame 4 is prepared on the outside of the elastic pressing member 3 so as to limit the deformation of the elastic pressing member 3 to the outside in the radial direction. The inner shape of the regulating frame 4 only needs to have such a size as to regulate the deformation of the elastic pressing member 3 to the outside when the elastic pressing member 3 is compressed in the axis direction, and may be rectangular. However, in order to facilitate uniform deformation of the elastic pressing member 3, the internal dimensions of the regulating frame 4 preferably have a shape having a uniform distance from the outer shape of the elastic pressing member 3. As in the second embodiment, when the elastic pressing member 3 having a cylindrical shape is used, the internal dimensions of the regulating frame 4 preferably have a circular shape.

The second embodiment is the same as the first embodiment in that from the time point when the compression of the elastic pressing member 3 in its central line direction by the pressing plate 11 is started, pressure contact is continued, and after the lapse of a predetermined period of time, the undercoating adhesive layer 23 is stuck onto the inner surface of the bonding object 1. When the pressing plate 11 is returned to the original position, the inner and outer diameters of the elastic pressing member 3 are restored. Then, after cooling, the bonding object 1 is removed from the elastic pressing member 3, and thus a state in which the adhesive sheet 20 is bonded onto the outside of the bonding object 1 is achieved. Thus, the pretreatment for bonding the rubber layer onto the outer surface of the bonding object 1 is completed.

Figure 3:
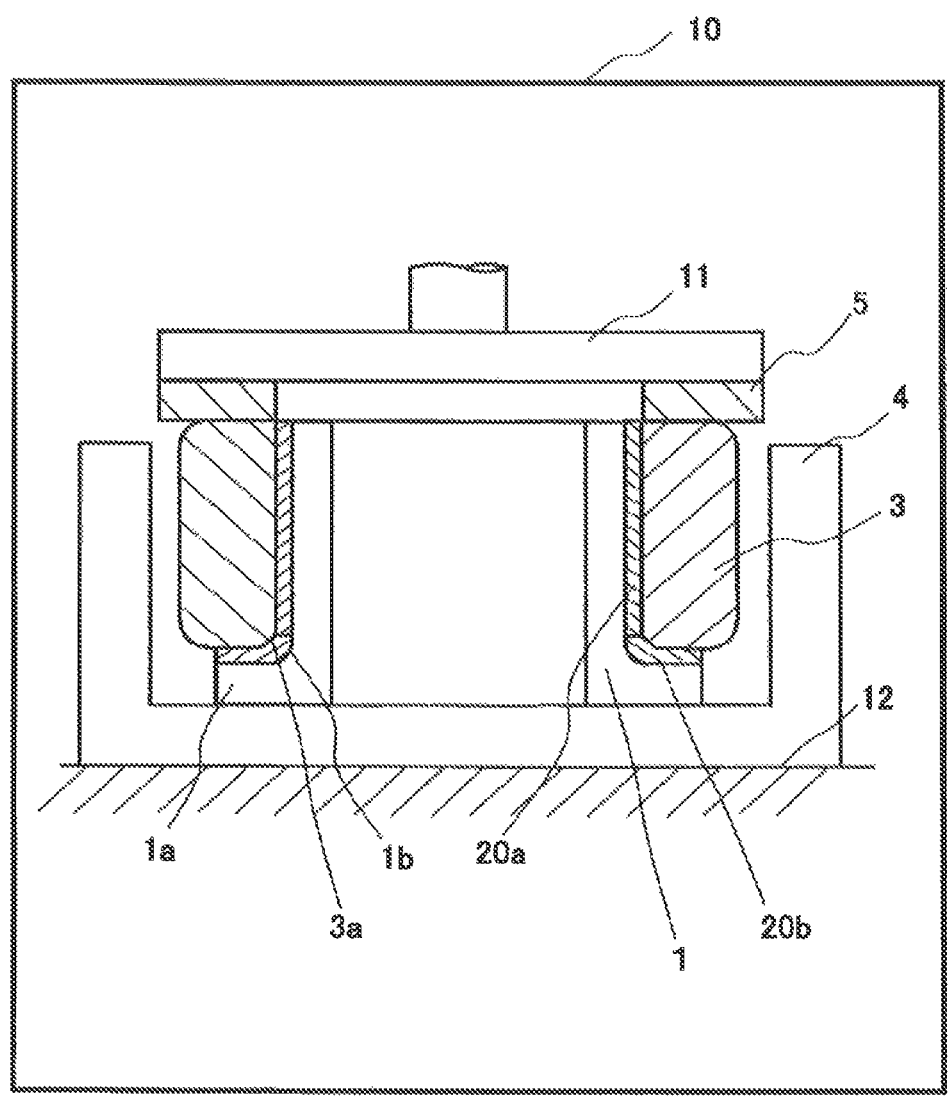
FIG. 3 is an illustration of a mass-production method involving forming an adhesion layer on the outer surface and flange portion of a tube having a flange portion according to a second embodiment of the present invention.

In addition, when the bonding object 1 having a tubular shape or a columnar shape has a flange at one end thereof, in the bonding of rubber layers onto both its straight tubular portion and flange, adhesion layers for bonding the rubber layers onto both the straight tubular portion and the flange may be simultaneously formed. For example, as illustrated in FIG. 3, the bonding object 1 has a flange 1a. In general, the flange 1a is attached by welding or the like, and hence has a round portion at a junction 1b. In such case, the undercoating adhesive 23 of an adhesion sheet 20a is bonded onto the straight tubular portion of the bonding object 1, and the undercoating adhesive 23 of an adhesion sheet 20b is bonded onto the flange portion 1a of the bonding object 1. As in the foregoing, the annular elastic pressing member 3 having a hollow portion is prepared. In this case, a chamfer 3a is arranged on the corner of the elastic pressing member 3 at the position corresponding to the junction 1b of the bonding object 1 to prevent the elastic pressing member 3 from being brought into contact with the junction 1b, and thus failing to press the tubular or columnar portion. In addition, in order that the elastic pressing member 3 can press the flange portion 1a, an end portion of the elastic pressing member 3 is arranged so as to abut against the film 21 of the adhesion sheet 20b bonded onto the flange portion 1a. Under this state, as described above, the elastic pressing member 3 is pressed with the pressing plate 11. As a result of this compressive force, the elastic pressing member 3 deforms in its radial direction to press the adhesion sheet 20a bonded onto the straight tubular portion of the bonding object 1, and the elastic pressing member 3 transmits the pressing force of the pressing plate 11 in its axis direction to press the film 21 of the adhesion sheet 20b bonded onto the flange portion 1a. Thus, when the bonding object 1 having a tubular shape or a columnar shape has a flange at one end thereof, the rubber layers can be bonded onto both the straight tubular portion and the flange.

Figure 4:
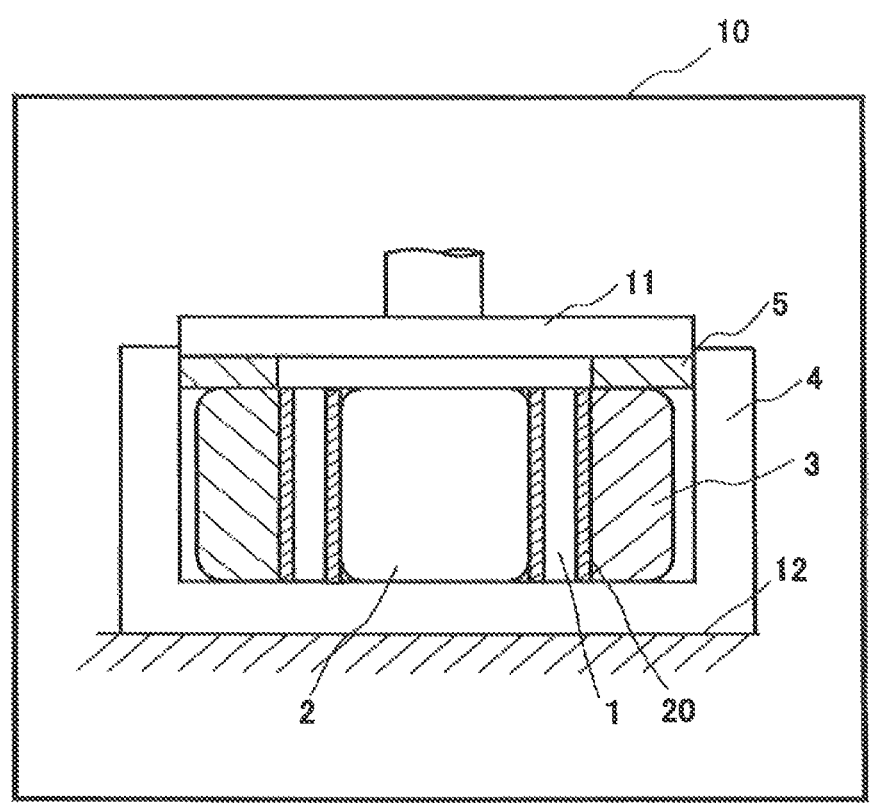
FIG. 4 is an illustration of a mass-production method involving simultaneously carrying out the methods according to the first and second embodiments of the present invention to form adhesion layers on both the inner surface and outer surface of a tube.

In addition, although the second embodiment has been described separately from the first embodiment, the first embodiment and the second embodiment may be simultaneously carried out. As illustrated in FIG. 4, as described in the first embodiment and the second embodiment, the adhesive sheets 20 are bonded onto the inner and outer surfaces of the bonding object 1. The elastic pressing member 2 and the elastic pressing member 3 are arranged so that the adhesive sheet 20 bonded onto the inner surface of the hollow portion of the bonding object 1 can be brought into pressure contact with the elastic pressing member 2 as in the first embodiment, and that the adhesive sheet 20 bonded onto the outer surface of the bonding object 1 can be brought into pressure contact with the elastic pressing member 2 in accordance with the second embodiment. When the pressing plate 11 is moved to compress the elastic pressing member 2 and the elastic pressing member 3, the elastic pressing member 2 and the elastic pressing member 3 simultaneously cause the adhesive sheets 20 bonded onto the inner and outer surfaces of the bonding object 1 to be brought into pressure contact, respectively.

(Third Embodiment)

Figure 5:
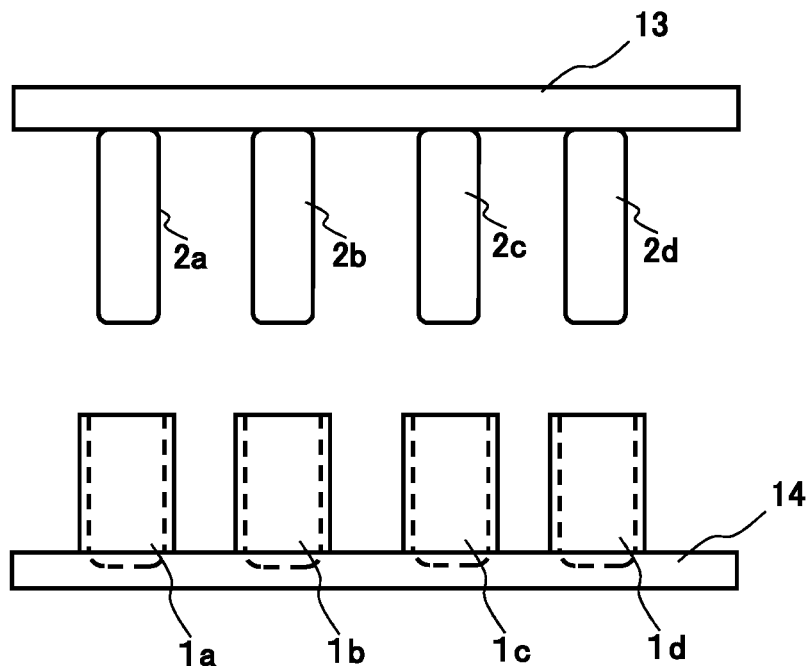
FIG. 5 is an illustration of a mass-production method involving forming an adhesion layer on the inner surface of a tube according to a third embodiment of the present invention.

Next, a method and apparatus for bonding, when performing pretreatment for bonding a rubber layer onto the inner surface of the bonding object 1 of the first embodiment, the adhesive sheets 20 onto the inner surfaces of a plurality of bonding objects 1 are described with reference to FIG. 5 and FIG. 6. In the third embodiment, the adhesive sheets 20 are bonded in the same manner as in the first embodiment simultaneously onto the inner surfaces of the plurality of bonding objects 1, and hence its configuration itself is the same as in the case of the first embodiment. Therefore, only differences are described here. In addition, although the heating chamber is not shown in FIG. 4 and FIG. 5, the third embodiment is also carried out in the heating chamber under an environment similar to that in the first embodiment.

The third embodiment is the same as the first embodiment also in that the pressing plate and the table are arranged in the heating chamber. In the third embodiment, however, as illustrated in FIG. 5, a plurality of elastic pressing members 2a, 2b, 2c, 2d are attached to a pressing plate 13. One end of each of the elastic pressing members 2a, 2b, 2c, 2d is attached so that the axis direction of each of the respective elastic pressing members 2a, 2b, 2c, 2d may be parallel to the moving direction of the pressing plate 13. Bonding objects 1a, 1b, 1c, 1d are placed on a table 14 so as to correspond to the pressing plate 13. The bonding objects 1a, 1b, 1c, 1d are placed so that the respective axis directions of the plurality of elastic pressing members 2a, 2b, 2c, 2d coincide with the axis directions of the respective inner surfaces of the bonding objects 1a, 1b, 1c, 1d. Here, the case where the four bonding objects 1a, 1b, 1c, 1d are present is described, but any number of bonding objects may be arranged as long as the number is two or more.

Figure 6:
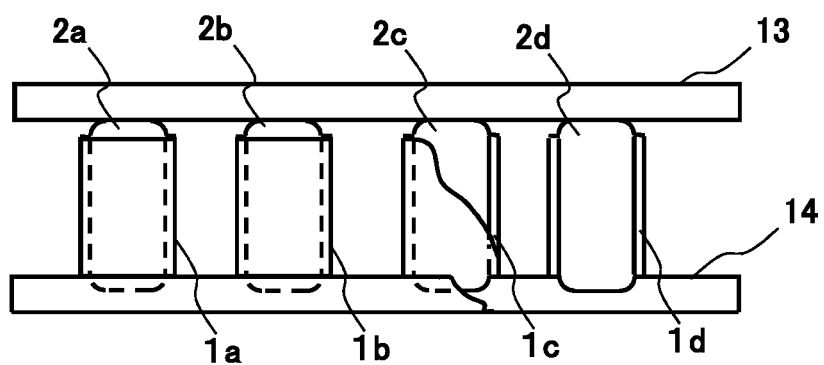
FIG. 6 is an illustration of a mass-production method involving forming an adhesion layer on the inner surface of a tube according to a third embodiment of the present invention.

As the pressing plate 13 moves, as illustrated in FIG. 6, the elastic pressing members 2a, 2b, 2c, 2d are inserted toward the inner parts of the bonding objects 1a, 1b, 1c, 1d. After the insertion of the elastic pressing members 2a, 2b, 2c, 2d into the bonding objects 1, compressive deformation of the elastic pressing members 2a, 2b, 2c, 2d starts when the other end of each of the elastic pressing members 2 is brought into contact with the upper surface of the table 12, with the result that pressure contact in which the film 21 of the adhesive sheet 20 is pushed against the inside of each of the bonding objects 1 is started.

In the first embodiment and the third embodiment, depending on the selection of the material for the elastic pressing member and the thickness or diameter thereof, stress is concentrated around the end portions of the elastic pressing members 2a, 2b, 2c, 2d and deformation of each end portion of the elastic pressing members 2a, 2b, 2c, 2d becomes larger than that of the middle portion thereof, with the result that pressing with a uniform force over the entirety of the elastic pressing members 2a, 2b, 2c, 2d in their longitudinal direction cannot be performed in some cases. Accordingly, recesses 14a, 14b, 14c, 14d each having a larger diameter than the diameter of each of the elastic pressing members 2a, 2b, 2c, 2d are arranged in positions at which the elastic pressing members 2a, 2b, 2c, 2d are brought into contact with the surface of the table 14. The depth of each of the recesses 14a, 14b, 14c, 14d may be set to such a depth that deformation of each end portion of the elastic pressing members 2a, 2b, 2c, 2d is larger than that of the middle portion.

(Fourth Embodiment)

Figure 7:
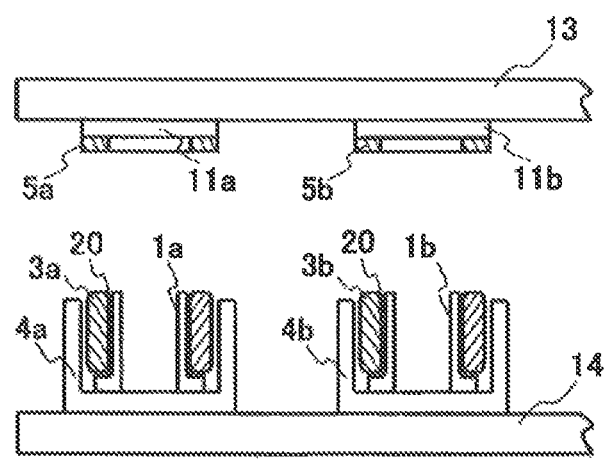
FIG. 7 is an illustration of a mass-production method involving forming an adhesion layer on the outer surface of a tube according to a fourth embodiment of the present invention.

In the third embodiment, the method involving simultaneously carrying out the first embodiment for the plurality of bonding objects 1a, 1b, 1c, 1d has been described. The fourth embodiment is a method involving simultaneously carrying out the second embodiment for the plurality of bonding objects 1a, 1b, 1c, 1d. As illustrated in FIG. 7, as in the second embodiment, the pressing plate 13 and the table 12 are arranged in the heating chamber (not shown). In the fourth embodiment, as illustrated in FIG. 7, a pressing plate 11a and a pressing plate 11b are attached to the pressing plate 13, and ring members 5a and 5b are attached thereto, respectively. The pressing plates 11a, 11b and the ring members 5a, 5b are the same as those in the second embodiment. Meanwhile, the bonding objects 1a, 1b are placed on the table 14 so as to correspond to the positions of the pressing plates 11a, 11b on the pressing plate 13. Here, the case where the two bonding objects 1a, 1b are present is described, but any number of bonding objects may be arranged as long as the number is two or more. The fourth embodiment is the same as the second embodiment also in that the corresponding number of the elastic pressing members 3a, 3b to the bonding objects 1a, 1b are placed so that their respective axis directions may coincide with the respective axis directions of the bonding objects 1a, 1b. The pressing plates 11a, 11b are moved in the respective axis directions of the bonding objects 1a, 1b to compress the elastic pressing members 3a, 3b. The fourth embodiment may be carried out in exactly the same manner as the second embodiment except that the number of the bonding objects 1a, 1b is two or more.

(Fifth Embodiment)

The first embodiment to the fourth embodiment are each a method involving forming an adhesion layer on the inner or outer surface of the bonding object 1 in the case of forming a tubular shape. However, the surface of the bonding object does not need to have a complete tubular shape. The fifth embodiment is a method involving applying the first to fourth embodiments to a bonding object whose surface of the bonding objects does not have a complete tubular shape. The fifth embodiment is described with reference to FIG. 8.

Figure 8:
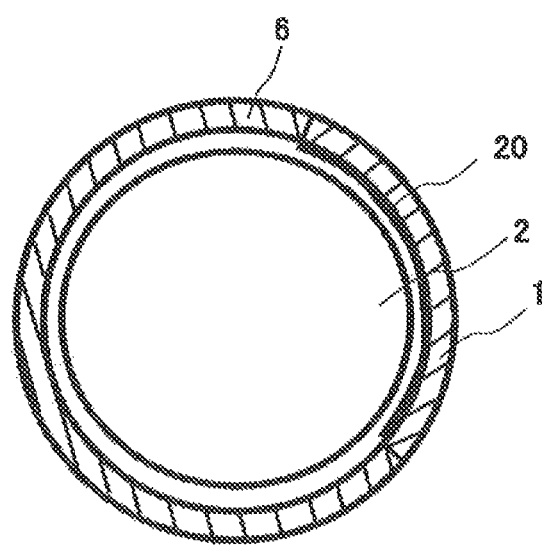
FIG. 8 is an illustration of a method of forming an adhesion layer on a curved surface according to a fifth embodiment of the present invention.
Figure 9:
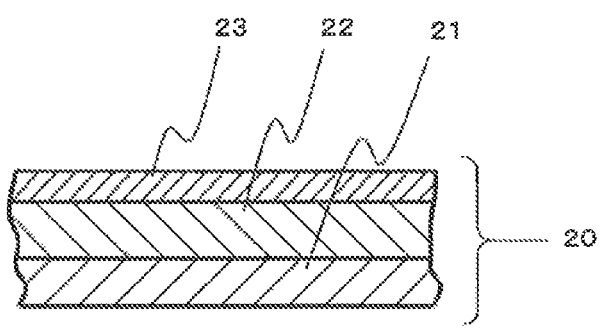
FIG. 9 is an illustration of an example of an adhesion sheet to be used in the present invention.

As illustrated in FIG. 8, the bonding object 1 does not form a complete tubular shape unlike the first embodiment to the third embodiment. In this case, the first to third embodiments may be carried out by preparing a jig 6. The jig 6 is produced so as to have an inner surface or outer surface having substantially the same curvature as that of the bonding object 1. Then, the jig 6 and the bonding object 1 are combined to form a tubular shape. It is appropriate to carry out the first to third embodiments by bonding the adhesion sheet 20 onto the bonding object 1 part. In addition, as long as the elastic pressing member 2 is selected so as to have substantially the same curvature as that of the bonding object 1, the curvature of the curved surface of the jig 6 may differ from the curvature of the bonding object 1. That is, when the jig 6 and the bonding object 1 are combined, a complete tubular shape does not need to be formed.

INDUSTRIAL APPLICABILITY

The invention of the present application can be applied to the case where an adhesive layer for bonding an unvulcanized rubber onto the inner or outer surface of a bonding object having a hollow tubular shape is formed.

REFERENCE SIGNS LIST 1 bonding object
2 elastic pressing member
3 elastic pressing member
10 heating chamber
11 pressing plate
12 table
13 pressing plate
20 adhesion sheet
21 film
22 top coating adhesive layer
23 undercoating adhesive layer

The invention claimed is:

1. A method of forming an adhesive layer for bonding an unvulcanized rubber layer with an adhesion sheet on an inner surface of a hollow portion of a bonding object made of a metal by an elastic pressing member, the bonding object having a shape of a tube, with a center axis and a length in a direction of the center axis,
    wherein the adhesion sheet includes a film, a top coating adhesive layer formed on the film and an undercoating adhesive layer formed on the top coating adhesive layer, the top coating adhesive layer having reactivity with an unvulcanized rubber, the undercoating adhesive layer having reactivity with the metal,
    wherein the elastic pressure member whose diameter increases by pressing the elastic pressing member in the direction of the center axis of the bonding object, the elastic pressing member having a length longer that the length the bonding object,
    the method comprising the steps of:
        attaching the adhesion sheet onto the inner surface of the hollow portion of the bonding object so that the undercoating adhesive layer of the adhesion sheet contacts the inner surface of the hollow portion;
        inserting the elastic pressing member into the hollow portion and compressing the elastic pressing member in the direction of the center axis of the bonding object to deform the elastic pressing member in a radial direction of the hollow portion of the bonding object to uniformly press the adhesion sheet through pressing of the film with heating the bonding object on which the adhesion sheet is bonded; and
        removing the film from the top coating adhesive layer formed on the undercoating adhesive layer adhered on the inner surface of the hollow portion of the bonding object.

2. A method according to claim 1, wherein the hollow portion has a cylindrical shape.

3. A method according to claim 1, wherein the hollow portion has a polygonal shape.

4. A method of forming an adhesive layer for bonding an unvulcanized rubber layer with an adhesion sheet by an elastic pressing member on an inner surface of a hollow portion of a bonding object made of a metal, the bonding object having a part of a shape of a part of a tube with a center axis and a length in a direction of the center axis,
    wherein a complete shape of the tube is formed by combining a curved shape member with the bonding object,
    wherein the adhesion sheet includes a film, a top coating adhesive layer formed on the film and an undercoating adhesive layer formed on the top coating adhesive layer, the top coating adhesive layer having reactivity with an unvulcanized rubber, the undercoating adhesive layer having reactivity with the metal, wherein the elastic pressing member whose diameter increases by pressing the elastic pressing member in a direction of the center axis of the bonding object, the elastic pressing member having a length longer than the length of the bonding object, the method comprising the steps of:
forming the complete shape of the tube by combining curved shape member with the bonding object;
attaching the adhesion sheet onto the inner surface of the hollow portion of the bonding object so that the undercoating adhesive layer of the adhesion sheet contacts he inner surface of the hollow portion;
inserting the elastic pressing member into the hollow portion and compressing the elastic pressing member in the direction of the center axis of the bonding object to deform the elastic pressing member in a radial direction of the hollow portion of the bonding object to uniformily press the adhesion sheet through pressing of the film with heating the bonding object on which the adhesion sheet is bonded; and
removing the film from the top coating adhesive layer formed on the undercoating adhesive layer adhered on the inner surface of the hollow portion of the bonding object.

5. A method of forming an adhesive layer for bonding an unvulcanized rubber layer with an adhesion sheet by an elastic pressing member onto an outside curved surface of a bonding object made of a metal, the bonding object having a shape of a tube or a cylinder with a center axis and a length in a direction of the center axis, wherein the adhesion sheet includes a film, a top coating adhesive layer formed on the film and an undercoating adhesive layer formed on the top coating adhesive layer, the top coating adhesive layer having reactivity with an unvulcanized rubber, the undercoating adhesive layer having reactivity with the metal,
wherein the elastic pressing member having a length longer than the bonding object and a doughnut shape including a hollow portion, a diameter of the elastic pressing member increases by pressing the elastic pressing member in the direction of the center axis of the bonding object in a state where the bonding object is inserted into the hollow portion of the elastic pressing member, the elastic pressing member having a length longer than the length of the bonding object;

the method comprising the steps of:
attaching the adhesion sheet onto the outside curved surface of the bonding object so that the undercoating adhesive layer of the adhesion sheet contacts the outside curved surface of the bonding object;
inserting the bonding object into the hollow portion of the elastic pressing member on which the adhesion sheet is attached and compressing the elastic pressing member in the center axis direction to deform the elastic pressing member in a radial direction of the bonding object to uniformly press the adhesion sheet through pressing of the film with heating the bonding object on which the adhesion sheet is bonded; and
removing the film from the top coating adhesive layer formed on the undercoating adhesive layer adhered on the inner surface of the hollow portion of the bonding object.

6. A method according to claim 5,
wherein the outside curved surface has a circular cross-section.

7. A method according to claim 5,
wherein the outside curved surface has a polygonal cross-section.

8. A method of forming an adhesive layer for bonding an unvulcanized rubber layer with an adhesion sheet on an inner surface of a hollow portion of a bonding object made of a metal by a first elastic pressing member and on at least a part of an outside curved surface of the bonding object by a second elastic pressing member, the bonding object having a shape of a tube including the outside curved surface with a center axis and a length in a direction of the central axis, wherein the adhesion sheet including a film, a top coating adhesive layer formed on the film and an undercoating adhesive layer formed on the top coating adhesive layer, the top coating adhesive layer having reactivity with an unvulcanized rubber, the undercoating adhesive layer having reactivity with the metal,
wherein the first elastic pressing member whose diameter increases by pressing the first elastic pressing member in a direction of the center axis of the bonding object, the first elastic pressing member having a length longer than the length of the bonding object, and the second elastic pressing member having a length longer than the length of the bonding object and a doughnut shape including a hollow portion, a diameter of the second elastic pressing member increases by pressing the second elastic pressing member in the direction of the center axis of the bonding object in a state where the bonding object is inserted into the hollow portion of the second elastic pressing member, the method comprising the steps of:
attaching the adhesion sheet onto the inner surface of the hollow portion of the bonding object and the at least the part of the outside curved surface so that the undercoating adhesive layer of the adhesion sheet contacts the inner surface of the hollow portion of the bonding object and the at least the part of the outside curved surface of the bonding object;
inserting the first elastic pressing member into the hollow portion of the bonding object and compressing the first elastic pressing member in the center axis direction of the bonding object to deform the first elastic pressing member in a radial direction of the bonding object to uniformly press the adhesion sheet through pressing of the film with heating the bonding object on which the adhesion sheet is bonded, and
inserting the bonding object into the hollow portion of the second elastic pressing member and compressing the second elastic pressing member in the center axis direction of the bonding object to deform the second elastic pressing member in the radial direction to uniformly press the adhesion sheet through pressing of the film with heating the bonding object on which the adhesion sheet is bonded, and
removing the film from the top coating adhesive layer formed on the undercoating adhesive layer adhered on the inner surface of the hollow portion and the at least part of the bonding object.

* * * * *